US011452255B2

(12) United States Patent
Umemoto et al.

(10) Patent No.: US 11,452,255 B2
(45) Date of Patent: Sep. 27, 2022

(54) WORK VEHICLE (71) Applicant: Kubota Corporation, Osaka (JP)

(72) Inventors: Hideya Umemoto, Sakai (JP); Hitoshi Aoyama, Sakai (JP); Katsuhiko Uemura, Sakai (JP); Takeshi Komorida, Sakai (JP); Kensuke Uemoto, Sakai (JP); Kentaro Shinkai, Sakai (JP); Shinichi Yamada, Sakai (JP); Kanako Komori, Sakai (JP)

(73) Assignee: Kubota Corporation, Osaka (JP)

( * ) Notice: Subject to any disclaimer, the term of this patent is extended or adjusted under 35 U.S.C. 154(b) by 693 days.

(21) Appl. No.: 16/432,039

(22) Filed: Jun. 5, 2019

(65) Prior Publication Data
US 2019/0387671 A1 Dec. 26, 2019

(30) Foreign Application Priority Data

Jun. 21, 2018 (JP) .............................. JP2018-118112

(51) Int. Cl.
A01D 34/00 (2006.01)
A01D 34/64 (2006.01)
A01D 34/74 (2006.01)
G05D 1/00 (2006.01)
G05D 1/02 (2020.01)
A01D 101/00 (2006.01)

(52) U.S. Cl.
CPC .......... *A01D 34/008* (2013.01); *A01D 34/64* (2013.01); *A01D 34/74* (2013.01); *G05D 1/0088* (2013.01); *G05D 1/0212* (2013.01); *A01D 2101/00* (2013.01); *G05D 2201/0208* (2013.01)

(58) Field of Classification Search
CPC ...... A01D 34/008; A01D 34/64; A01D 34/74; A01D 2101/00; G05D 1/0088; G05D 1/0212; G05D 2201/0208
USPC .......................................................... 701/28
See application file for complete search history.

(56) References Cited

U.S. PATENT DOCUMENTS

2005/0108998 A1   5/2005  Hunt et al.
2007/0046044 A1*  3/2007  Tanabe ................... B60R 21/34
                                                    293/120
2008/0136613 A1*  6/2008  Takafuji ............. B60R 21/0132
                                                    340/436
2008/0203742 A1*  8/2008  Takahashi ............ B60R 19/483
                                                    293/117

(Continued)

FOREIGN PATENT DOCUMENTS

EP     1532856 A2    5/2005
EP     3225094 A1   10/2017

(Continued)

Primary Examiner — Muhammad Shafi
(74) Attorney, Agent, or Firm — The Webb Law Firm (57) ABSTRACT A work vehicle that performs an operation while traveling autonomously includes: a base frame configured to support a wheel; a unit frame configured to support an operation unit that performs the operation; a link frame capable of changing a relative height of the unit frame with respect to the base frame, the link frame spanning between the base frame and the unit frame; and a setting unit configured to set an operating height of the operation unit with respect to a working surface of a working field in which the operation is performed, in accordance with operation information indicating an operation target to be subjected to the operation.

9 Claims, 5 Drawing Sheets (56) References Cited

U.S. PATENT DOCUMENTS

| | | | |
|---|---|---|---|
| 2011/0166701 A1* | 7/2011 | Thacher | A01G 25/00 700/245 |
| 2011/0166715 A1* | 7/2011 | Hoffman | A01G 25/16 700/284 |
| 2013/0211645 A1* | 8/2013 | Yamamura | G05D 1/0225 701/22 |
| 2016/0128275 A1 | 5/2016 | Johnson | |
| 2017/0020064 A1* | 1/2017 | Doughty | A01D 34/008 |
| 2017/0181375 A1* | 6/2017 | Hashimoto | A01D 34/74 |
| 2017/0280623 A1* | 10/2017 | Yamamura | G05D 1/0265 |
| 2017/0367257 A1* | 12/2017 | Cmich | A01D 34/66 |
| 2018/0064024 A1* | 3/2018 | Choi | G05D 1/0274 |

FOREIGN PATENT DOCUMENTS

| | | | |
|---|---|---|---|
| GB | 2532592 A | 5/2016 | |
| JP | 56134130 U | 10/1981 | |
| JP | 5284806 A | 11/1993 | |
| JP | 2013164741 A | 8/2013 | |
| JP | 2017112927 A | 6/2017 | |
| JP | 2017176117 A | 10/2017 | |

\* cited by examiner

| level | grass height | grass density | operating height |
|---|---|---|---|
| 1 | smaller than or equal to predetermined value | smaller than or equal to predetermined value | first height |
| 2 | exceed predetermined value | smaller than or equal to predetermined value | second height |
| 3 | smaller than or equal to predetermined value | exceed predetermined value | first height |
| 4 | exceed predetermined value | exceed predetermined value | second height |

WORK VEHICLE

CROSS REFERENCE TO RELATED APPLICATIONS

This application claims priority to Japanese Patent Applications Nos. 2018-118112 and 2018-118113 filed Jun. 21, 2018, the disclosures of which are hereby incorporated by reference in their entirety.

TECHNICAL FIELD

The present invention relates to a work vehicle that performs an operation while traveling autonomously.

BACKGROUND ART

Conventionally, a technology for causing a vehicle to travel autonomously has been used. Examples of such a vehicle that travels autonomously include a work vehicle that travels autonomously while performing a predetermined operation (e.g. lawn mowing) in a large field. JP 2013-164741 A describes an example of this kind of technology.

An unmanned travel work vehicle described in JP 2013-164741 A includes an electric motor that is mounted in a vehicle body and is supplied with power from a battery, and a running motor that is mounted in the vehicle body. This unmanned travel work vehicle performs an operation by driving an operation machine mounted in the vehicle body using the electric motor, while driving wheels using the running motor and traveling in a working area.

Conventionally, a technology for causing a vehicle to travel autonomously has been used. Examples of such a vehicle that travels autonomously include a work vehicle that travels unmanned while performing a predetermined operation (e.g. lawn mowing) in a large field. JP 2013-164741A describes an example of a technology related to such a work vehicle.

An unmanned travel work vehicle described in JP 2013-164741A includes an electric motor that is mounted in a vehicle body and is supplied with power from a battery, and a running motor that is mounted in the vehicle body. This unmanned travel work vehicle performs an operation by driving an operation machine mounted in the vehicle body using the electric motor, while driving wheels using the running motor and traveling in a working area.

SUMMARY

A problem corresponding to the background art [1] is as follows.

As mentioned above, the technology described in JP 2013-164741A is for performing an operation while driving an operation machine mounted in the vehicle body. However, in the case where, for example, the operation is a mowing operation as described in Patent JP 2013-164741A, the degree of growth of grass may differ depending on the season. The greater the grass height, the heavier the working load, and thus the operation cannot be performed smoothly in some cases. Moreover, if the required mowing height differs between working fields, a user needs to adjust the mowing height when necessary.

Thus there is a demand for a work vehicle capable of automatically changing the operating height, i.e. the height at which the operation is performed, in accordance with an operation target.

A problem corresponding to the background art [2] is as follows.

As mentioned above, the technology described in JP 2013-164741A is for performing an operation while driving the operation machine mounted in the vehicle body. However, in the case where, for example, the operation is a mowing operation as described in JP 2013-164741A, the degree of growth of grass may differ even between different locations within a single working field. For this reason, the grass height and the grass density in a single working field are not necessarily uniform. Then the technology described in JP 2013-164741A may not enable the operation to be performed smoothly if the grass height and/or the grass density is not uniform.

There is a demand for a work vehicle capable of smoothly performing the operation thereof.

A means for solving the problem [1] is as follows.

A characteristic configuration of a work vehicle according to an aspect of the present invention lies in a work vehicle that performs an operation while traveling autonomously, including: a base frame configured to support a wheel; a unit frame configured to support an operation unit that performs the operation; a link frame capable of changing a relative height of the unit frame with respect to the base frame, the link frame spanning between the base frame and the unit frame; and a setting unit configured to set an operating height of the operation unit with respect to a working surface of a working field in which the operation is performed, in accordance with operation information indicating an operation target to be subjected to the operation.

With this characteristic configuration, the operating height can be automatically changed in accordance with operation information. Accordingly, a plurality of operations to be performed at different operating heights can also be adapted to.

Also, it is preferable that the operation is a lawn mowing operation to cut lawn grass growing on the working field; the work vehicle further includes an evaluation unit configured to evaluate a grass height of the lawn grass and a grass density of the lawn grass; and the setting unit sets the operating height in accordance with a result of the evaluation performed by the evaluation unit.

With this configuration, the operating height can be changed in accordance with the grass height and the grass density of lawn grass. Also, a mowing operation can be performed at separate times depending on the grass height and the grass density of lawn grass. Thus the load on the operation unit can be reduced. Accordingly, it is also possible to reduce the size of the operation unit and reduce the output required (i.e. reduce the horsepower required).

Also, it is preferable that the work vehicle further includes a captured image acquisition unit configured to acquire a captured image obtained by capturing an image of the working field, wherein the evaluation unit evaluates the grass height and the grass density based on the captured image.

With this configuration, the grass height and the grass density of lawn grass can be recognized from a captured image, and then the operating height can be changed. Thus, this configuration can also reduce the load on the operation unit. As a result, it is possible to reduce the size of the operation unit and reduce the output required (i.e. reduce the horsepower required).

Also, it is preferable that the work vehicle further includes a working field map acquisition unit configured to acquire a map illustrating the working field; a path information acquisition unit configured to acquire traveling path information indicating a traveling path during the operation; and a determination unit configured to determine whether or not a current location is in an area where the lawn grass has been cut, based on the map and the traveling path information, wherein the evaluation unit evaluates the grass height and the grass density based on a result of the determination performed by the determination unit.

With this configuration, the grass height and the grass density of lawn grass can be recognized from a movement trajectory of the work vehicle, and then the operating height can be changed. Thus, this configuration can also reduce the load on the operation unit. As a result, it is possible to reduce the size of the operation unit and reduce the output required (i.e. reduce the horsepower required).

Also, it is preferable that the work vehicle further includes a load sensor configured to detect a load; and a bumper member to which the load sensor is attached, the bumper member being supported by the base frame so as to at least surround the operation unit and the wheel, wherein the bumper member is configured to be in a state of surrounding the operation unit and the wheel even if a height of the unit frame with respect to the base frame is changed.

With this configuration, even if the operating height has been changed, the gap between the bumper member and the working surface can be kept fixed (i.e. an unnecessarily large gap can be prevented from being formed between the bumper member and the working surface). Accordingly, a user can be prevented from accidentally inserting a hand or a foot into the operation unit and getting injured.

Also, it is preferable that the work vehicle further includes a control unit configured to, if the load sensor detects a load that is greater than or equal to a preset value, stop running the operation unit and roll the wheel in a direction opposite to a direction in which the wheel was rolling when the load sensor detected the load that is greater than or equal to the preset value.

With this configuration, if the load sensor detects a load that is greater than or equal to the preset value, the driving of the operation unit can be stopped, and the work vehicle can be caused to travel in a direction opposite to the direction in which the work vehicle has been traveling thus far. Accordingly, even if a person approaches the work vehicle, the person can be prevented from getting injured.

A means for solving the problem [2] is as follows.

A characteristic configuration of a work vehicle according to an aspect of the present invention lies in a work vehicle that performs an operation while traveling autonomously, including: an operation unit configured to perform the operation, the operation unit being mounted in a vehicle body, wherein the operation unit includes a load reduction unit configured to perform an operation for reducing a load of the operation whose load is greater than a preset load, and an operation completion unit configured to perform an operation, which is the remainder of the operation, for which the load reduction unit has reduced the load.

With this characteristic configuration, an operation can be completed by first performing the operation using the load reduction unit to reduce the load, and then performing the remainder of the operation using the operation completion unit. Accordingly, the load on the operation unit can be reduced compared with the case where these operations are performed all at once. As a result, the time required for the operation can be shortened, and the operation can be performed smoothly. In addition, the operation unit can also be prevented from deteriorating or getting damaged.

Also, it is preferable that the load reduction unit is provided in a front portion of the vehicle body relative to a traveling direction, and the operation completion unit is provided in a rear portion of the vehicle body relative to the traveling direction.

With this configuration, the load can be automatically shared between the load reduction unit and the operation completion unit in accordance with the traveling of the work vehicle.

Also, it is preferable that the operation completion unit is provided in a center portion of the vehicle body as viewed from above, and the load reduction unit is provided so as to surround the operation completion unit in the vehicle body as viewed from above.

With this configuration as well, the work vehicle can complete the operation while appropriately traveling autonomously.

Also, it is preferable that the work vehicle further includes a load calculation unit configured to calculate a load of the operation, the load calculation unit being provided forward of the operation unit relative to the traveling direction in the vehicle body; and a decision unit configured to decide whether to drive both the load reduction unit and the operation completion unit or to only drive the operation completion unit, based on a result of the calculation performed by the load calculation unit.

With this configuration, the driving of the operation unit can be controlled in accordance with the load. Thus energy can be saved.

Also, it is preferable that the operation unit is driven by a motor that is supplied with electric power from a battery mounted in the vehicle body, and the decision unit decides a running state of the operation unit also using a cost required to complete the operation, the cost being calculated based on at least one of time required for an operation that was previously performed in the same working field, the number of times that the battery was charged, and power consumption required for the operation.

With this configuration, the operation can be optimized, and the running cost can be suppressed.

BEST MODE FOR CARRYING OUT THE INVENTION

First Embodiment

The first embodiment of the present invention will be described below.

The work vehicle according to the present invention is configured to be able to automatically change the operating height, i.e. the height at which an operation is performed, in accordance with an operation target. The work vehicle performs the operation while traveling autonomously, and the following description will take a mowing operation to mow grass that is growing in a working field as an example of the operation performed by the work vehicle. Here, "autonomous traveling" according to this embodiment refers to traveling while avoiding objects (e.g. obstacles) along a traveling path that is set based on the output of a device mounted in the work vehicle (e.g. output of a sensor, an image captured by a camera etc.). Such a work vehicle corresponds to a so-called autonomous robot.

Figure 1:
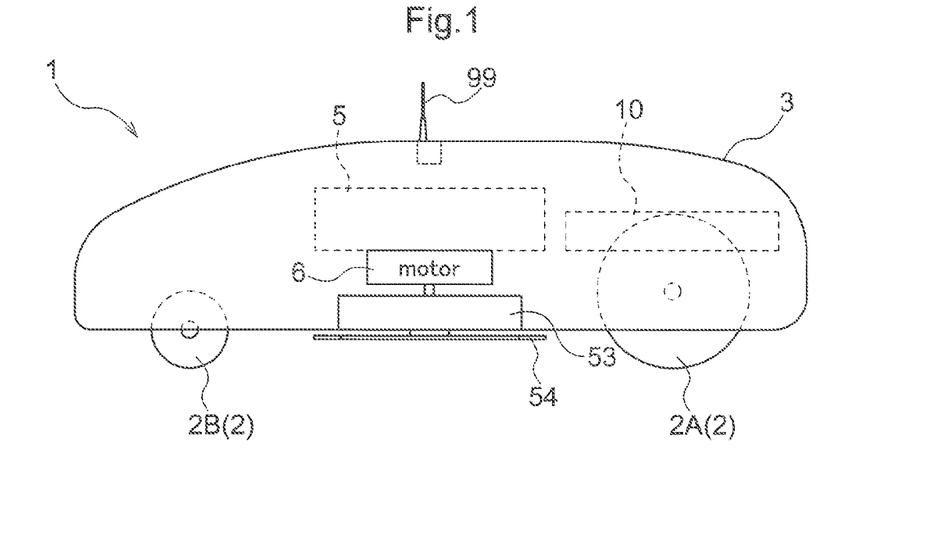
FIG. 1 illustrates a first embodiment (the same applies to FIGS. 2 to 5), and is a side view of a work vehicle.
Figure 2:
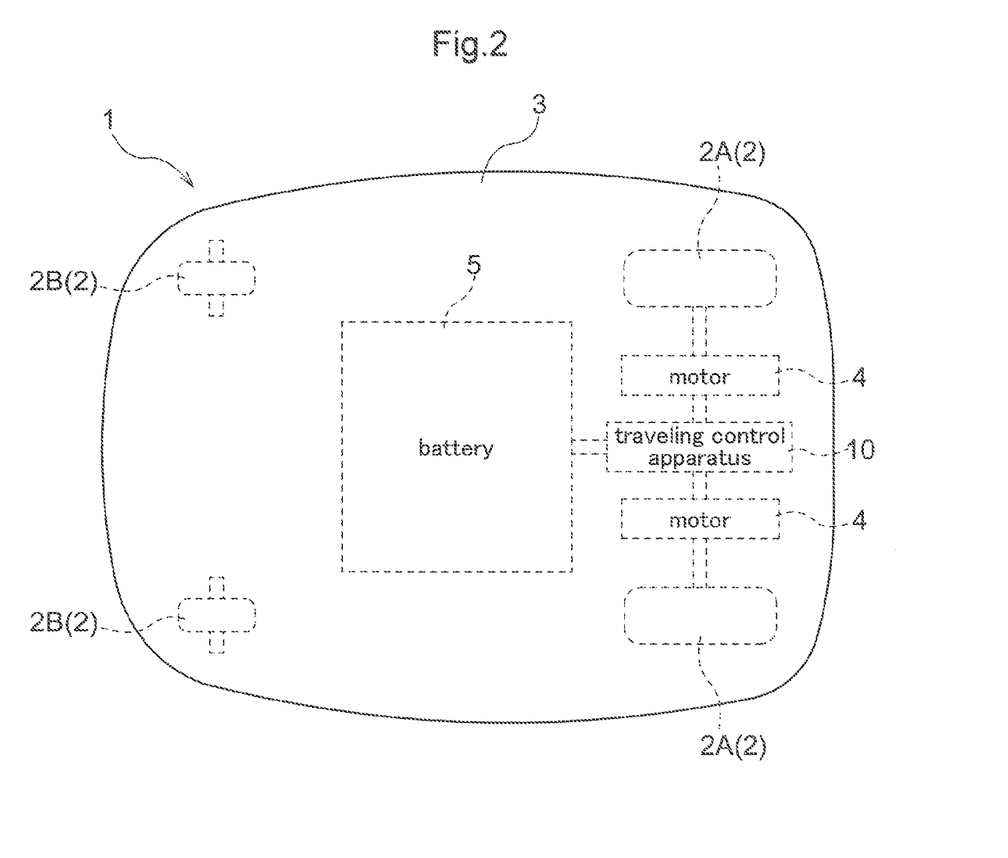
FIG. 2 is a plan view of the work vehicle.

FIG. 1 is a side view of a work vehicle 1 according to this embodiment, and FIG. 2 is a plan view of the work vehicle 1. As shown in FIGS. 1 and 2, the work vehicle 1 includes wheels 2 and a body 3 (an example of a vehicle body). The wheels 2 include first wheels 2A on one end side of the vehicle body in the vehicle-lengthwise direction, and second wheels 2B on the other end side in the vehicle-lengthwise direction. A pair of left and right first wheels 2A and a pair of left and right second wheels 2B are provided, respectively in the vehicle-widthwise direction. In this embodiment, the first wheels 2A are provided on the rear side of the work vehicle 1 relative to the traveling direction. The first wheels 2A are configured as wheels that are driven and steered. The first wheels 2A are driven by a later-described traveling control apparatus 10. The second wheels 2B are provided on the front side of the work vehicle 1 relative to the traveling direction. The second wheels 2B are configured as so-called caster wheels. With this configuration, if the left and right first wheels 2A are rolling in the same direction at the same speed, the work vehicle 1 travels straight. If the left and right first wheels 2A are rolling in the same direction at different speeds, the work vehicle 1 is in a state of being steered toward the side of one of the left and right first wheels 2A that is rolling at a lower speed. Furthermore, if the left and right first wheels 2A are rolling in different directions at the same speed, the work vehicle 1 can rotate on the spot. Although, in the above description, a pair of left and right first wheels 2A and a pair of left and right second wheels 2B are provided, respectively in the vehicle-widthwise direction, this is merely an example. For example, the number of first wheels 2A may differ from the number of second wheels 2B, or the number of first wheels 2A and the number of second wheels 2B may be one or three or more, in accordance with the size of the vehicle body.

The body 3 is provided with a pair of motors 4, which serve as motive power sources for the first wheels 2A, a battery 5 for storing electric power and supplying electric power to the motors 4 and electrical devices that the work vehicle 1 has, a traveling control apparatus 10 for controlling the traveling of the work vehicle 1, and a motor 6 for driving a lawn mowing apparatus 53 (an example of an operation unit), which has a mowing blade 54, which is used in a lawn mowing operation. The motor 6 is driven by electric power supplied by the battery 5.

The body 3 is also provided with a satellite positioning module 99, which is configured as a GNSS module. The satellite positioning module 99 has a satellite antenna for receiving a GPS signal or a GNSS signal ("GPS signal" in this embodiment). Note that the satellite positioning module 99 may include an inertial navigation module that incorporates a gyro-acceleration sensor and/or a magnetic direction sensor to complement satellite navigation. Needless to say, the inertial navigation module may be provided at a location separate from the satellite positioning module 99. The GPS signal acquired by the satellite positioning module 99 is used in the aforementioned autonomous traveling of the work vehicle 1, and also serves as "position information obtained by a GPS" and is used by later-described functional units.

Figure 3:
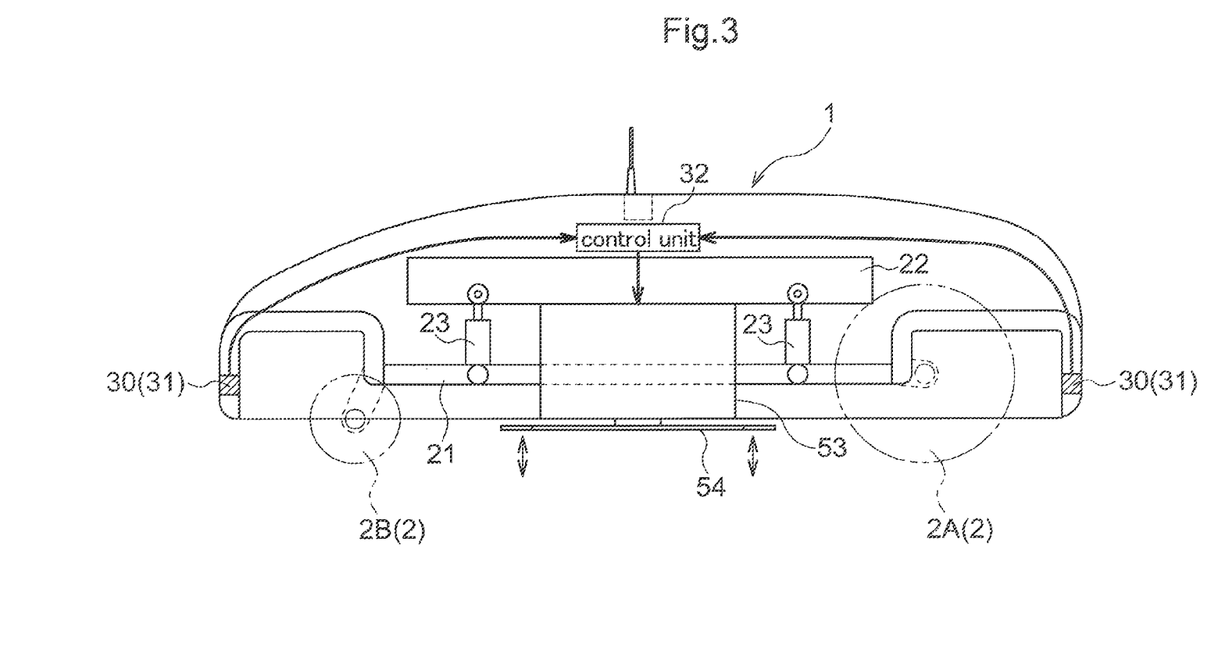
FIG. 3 is a structural diagram illustrating a structure of the work vehicle.
Figure 4:
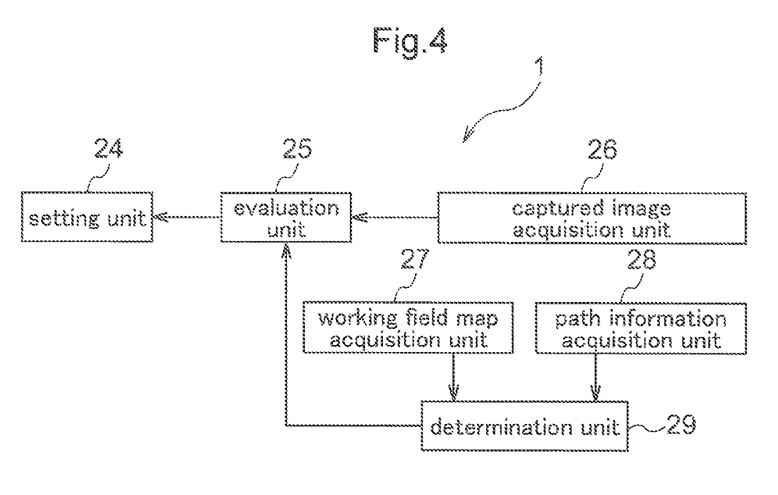
FIG. 4 is a block diagram that schematically illustrates functional units of the work vehicle.

FIG. 3 is a structural diagram that more specifically illustrates a structure of the work vehicle 1. FIG. 4 is a block diagram that schematically illustrates functional units of the work vehicle 1. As shown in FIGS. 3 and 4, the work vehicle 1 includes a base frame 21, a unit frame 22, link frames 23, a setting unit 24, an evaluation unit 25, a captured image acquisition unit 26, a working field map acquisition unit 27, a path information acquisition unit 28, a determination unit 29, load sensors 30, bumper members 31, and a control unit 32.

The base frame 21 supports the wheels 2. As mentioned above, the wheels 2 include a pair of first wheels 2A and a pair of second wheels 2B. Accordingly, the base frame 21 supports the pair of first wheels 2A and the pair of second wheels 2B. It is favorable that the base frame 21 is configured to support rotary shafts of the pair of first wheels 2A and the pair of second wheels 2B.

The unit frame 22 supports the lawn mowing apparatus 53. In this embodiment, the mowing blade 54 is provided in a state of opposing a working surface in a portion of the lawn mowing apparatus 53 on one side in the vertical direction. Accordingly, the lawn mowing apparatus 53 is supported by the unit frame 22 from the other side in the vertical direction.

The link frames 23 span between the base frame 21 and the unit frame 22. The link frames 23 are provided so as to be able to change the relative height of the unit frame 22 with respect to the base frame 21. Note that "to span between the base frame 21 and the unit frame 22" means that one end portion of each link frame 23 is fixed to the base frame 21, and the other end portion of each link frame 23 is fixed to the unit frame 22. It is favorable that these link frames 23 are constituted by stretchable dampers. The relative height of the unit frame 22 with respect to the base frame 21 can be changed due to the dampers stretching or contracting.

The setting unit 24 sets the operating height of the lawn mowing apparatus 53 with respect to the working surface of a working field in which the operation is performed, in accordance with operation information, which indicates an operation target that is to be subjected to the operation. In this embodiment, the operation target that is to be subjected to the operation is lawn grass. The operation information is information that indicates the state of the lawn grass. The state of the lawn grass is information that indicates a grass height and/or a grass density of the lawn grass. The working surface of the working field in which the operation is performed is a surface on which lawn grass is growing, of the working field in which the lawn mowing operation is performed. A surface with which the wheels 2 of the work vehicle 1 come into contact corresponds to the working surface of the working field in which the operation is performed. The operating height of the lawn mowing apparatus 53 is the height at which the lawn mowing operation is performed, and means, specifically, the height of the mowing blade 54. Accordingly, the setting unit 24 sets the height of the mowing blade 54 of the lawn mowing apparatus 53 with respect to the surface with which the wheels 2 of the work vehicle 1 come into contact, in accordance with information that indicates the grass height and/or grass density of the lawn grass.

In this embodiment, the work vehicle 1 is provided with a camera (not shown) for capturing an image of the front side of the working field relative to the traveling direction of the work vehicle 1. The captured image acquisition unit 26 acquires a captured image obtained as a result of the camera capturing an image of the working field. The captured image acquired by the captured image acquisition unit 26 is transferred to the later-described evaluation unit 25.

The evaluation unit 25 evaluates the grass height and the grass density of lawn grass based on the captured image transferred from the captured image acquisition unit 26. Specifically, the evaluation unit 25 performs image recognition processing on the captured image, and evaluates (calculates) the grass height and the grass density of lawn grass that is included in the captured image. The result of the evaluation performed by the evaluation unit 25 is transferred to the aforementioned setting unit 24.

Figure 5:
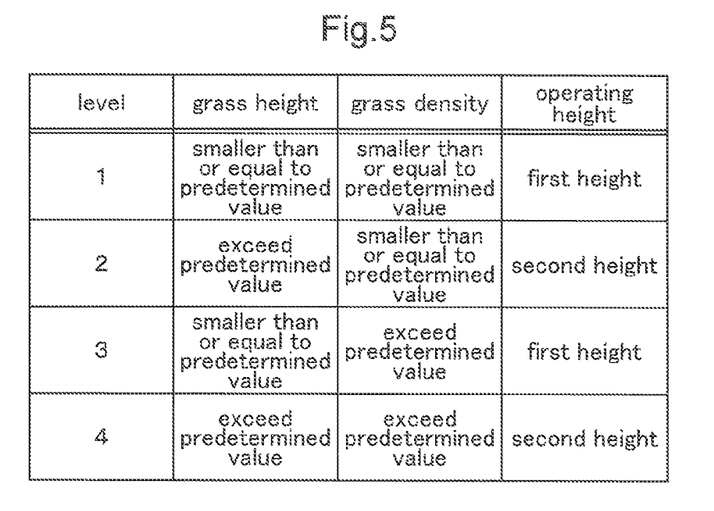
FIG. 5 illustrates operating height settings.

The setting unit 24 sets the height of the mowing blade 54 of the lawn mowing apparatus 53 based on the evaluation result from the evaluation unit 25. Specifically, as shown in FIG. 5, the operating height is set to a predetermined first height if the grass height of the lawn grass is less than or equal to a predetermined value and the grass density is less than or equal to a predetermined value (level 1), for example. Also, for example, the operating height is set to a second height, which is greater than the first height, if the grass height of the lawn grass exceeds the predetermined value but the grass density is smaller than or equal to the predetermined value (level 2). Also, for example, the operating height is set to the first height if the grass height of the lawn grass is less than or equal to the predetermined value but the grass density exceeds the predetermined value (level 3). Also, for example, the operating height is set to the second height if the grass height of the lawn grass exceeds the predetermined value and the grass density exceeds the predetermined value (level 4). It is favorable that the setting unit 24 sets the operating height in this manner.

Thus, the work vehicle 1 can automatically set the height of the mowing blade 54 with respect to the working surface. Specifically, it is favorable that the setting unit 24 is configured to be able to increase or reduce the operating height of the lawn mowing apparatus 53 using a stepper motor in accordance with the aforementioned operating height. Needless to say, the setting unit 24 can alternatively be configured to be able to continuously increase or reduce the operating height using a compressor and an air bag.

The working field map acquisition unit 27 acquires a map that illustrates the working field. The working field is set by the user before the lawn mowing operation is performed. The working field map acquisition unit 27 acquires the map that is set by the user and illustrates the working field.

The path information acquisition unit 28 acquires traveling path information, which indicates a traveling path of the work vehicle 1 when performing the lawn mowing operation. The work vehicle 1 travels autonomously. This autonomous traveling is controlled by the traveling control apparatus 10. The path information acquisition unit 28 acquires traveling path information that indicates a traveling path through which the work vehicle 1 has traveled autonomously. It is preferable that the traveling path is calculated using position information obtained by a GPS.

The determination unit 29 determines whether or not a current location is in an area where grass has been mowed, based on the map and the traveling path information. The map is transferred to the determination unit 29 from the working field map acquisition unit 27, and path information is transferred to the determination unit 29 from the path information acquisition unit 28. It is favorable that the determination unit 29 divides the working field in the transferred map into a plurality of areas, for example. Furthermore, it is favorable that the determination unit 29 classifies each area into an area where the work vehicle 1 has traveled and an area where the work vehicle 1 has not traveled, based on the traveling path information. Furthermore, it is favorable that the determination unit 29 determines whether or not the area where the work vehicle 1 is currently present is an area where grass has been mowed. The result of the determination performed by the determination unit 29 is transferred to the aforementioned evaluation unit 25.

The evaluation unit 25 can also evaluate the grass height and the grass density of lawn grass based on the determination result from the determination unit 29. That is to say, in the case where the work vehicle 1 is about to travel in an area for which it is determined by the determination unit 29 that the lawn mowing operation has not yet been performed, it is favorable that the evaluation unit 25 performs the evaluation as illustrated in FIG. 5, and the setting unit 24 sets the height of the mowing blade 54 with respect to the working surface to any of the operating heights shown in FIG. 5. Also, in the case where the work vehicle 1 is about to travel in an area for which it is determined by the determination unit 29 that the lawn mowing operation has already been performed, it is favorable that the evaluation unit 25 performs an evaluation such that the height of the mowing blade 54 with respect to the working surface is set to an operating height that does not affect the traveling. It is also possible that the evaluation unit 25 is configured to evaluate the type of lawn grass using a captured image, and the setting unit 24 is configured to set the operating height in accordance with the grass type.

Returning to FIG. 3, each of the load sensors 30 detects a load. In this embodiment, a pair of load sensors 30 are provided, one on the front side of the work vehicle 1 relative to the traveling direction, and the other on the rear side relative to the traveling direction. In this embodiment, these load sensors 30 are attached to the later-described bumper members 31. Each of the load sensors 30 detects a pressure that acts on a corresponding one of the bumper members 31, and transfers the detection result to the traveling control apparatus 10.

The bumper members 31 are supported by the base frame 21 so as to at least surround the lawn mowing apparatus 53 and the wheels 2. To "surround the lawn mowing apparatus 53 and the wheels 2" refers to a state where the bumper members 31 are located outward of the lawn mowing apparatus 53 and the wheels 2 as viewed from above the work vehicle 1. In this embodiment, a pair of bumper members 31 are provided. One of the bumper members 31 is provided rearward of the first wheels 2A relative to the traveling direction of the work vehicle 1, and the other one of the bumper members 31 is provided forward of the second wheels 2B relative to the traveling direction of the work vehicle 1. The pair of bumper members 31 are fixed to the base frame 21.

The bumper members 31 are configured to surround the lawn mowing apparatus 53 and the wheels 2 even if the height of the unit frame 22 with respect to the base frame 21 is changed. As mentioned above, the height of the unit frame 22 with respect to the base frame 21 can be changed by the link frames 23. The bumper members 31 are provided so as to keep a fixed gap between the lawn mowing apparatus 53 and the working surface even if the aforementioned height is changed by the link frames 23 such that the lawn mowing apparatus 53 and the wheels 2 are not exposed, i.e. the lawn mowing apparatus 53 and the wheels 2 cannot be seen from the front side and the rear side of the work vehicle 1 relative to the traveling direction. This configuration can prevent an object other than grass from being stuck in the lawn mowing apparatus 53, and prevent the wheels 2 from riding up such an object.

The control unit 32 stops running the lawn mowing apparatus 53 if any of the load sensors 30 detects a load that is greater than or equal to a preset value, and causes the wheels 2 to roll in a direction opposite to the direction in which the wheels 2 were rolling when the load that is greater than or equal to the preset value was detected. The result of detection performed by each of the load sensors 30 is transferred to the control unit 32. If the detection result transferred from any of the load sensors 30 indicates detection of a load that is greater than or equal to the preset value, the control unit 32 stops running the lawn mowing apparatus 53. This configuration can prevent an object that has applied a pressure to the load sensors 30 from being stuck in the lawn mowing apparatus 53. Furthermore, the control unit 32 controls the traveling control apparatus 10 so as to travel in a direction opposite to the direction in which the work vehicle 1 was traveling before any of the load sensors 30 detected a load. Thus the work vehicle 1 travels backward. As a result, the wheels 2 can be withdrawn from the object that has applied a pressure to the load sensors 30.

Variations of First Embodiment

In the above-described embodiment, the evaluation unit 25 evaluates the grass height and the grass density of lawn grass, and the setting unit 24 sets the operating height in accordance with the evaluation result from the evaluation unit 25. However, the setting unit 24 can alternatively be configured to set the operating height regardless of the evaluation result from the evaluation unit 25. In this case, the work vehicle 1 may not be provided with the evaluation unit 25.

In the above-described embodiment, the captured image acquisition unit 26 acquires a captured image of a working field, and the evaluation unit 25 evaluates the grass height and grass density of lawn grass based on the captured image. However, the evaluation unit 25 can alternatively be configured to evaluate the grass height and grass density of lawn grass without using a captured image.

In the above-described embodiment, the working field map acquisition unit 27 acquires a map that illustrates a working field, and the path information acquisition unit 28 acquires traveling path information that indicates a traveling path during the operation. Also, in the above-described embodiment, the determination unit 29 determines whether or not the current location is in an area where grass has already been mown, based on the map and the traveling path information, and the evaluation unit 25 evaluates the grass height and the grass density of lawn grass based on the determination result from the determination unit 29. However, the work vehicle 1 can alternatively be configured to not include the working field map acquisition unit 27, the path information acquisition unit 28, and the determination unit 29.

In the above-described embodiment, the load sensors 30 are attached to the bumper members 31, but the load sensors 30 may alternatively be attached to members other than the bumper members 31.

In the above-described embodiment, the bumper members 31 are configured to surround the lawn mowing apparatus 53 and the wheels 2 even if the height of the unit frame 22 with respect to the base frame 21 is changed. However, a configuration may alternatively be employed in which the lawn mowing apparatus 53 and the wheels 2 are exposed from the bumper members 31 if the height of the unit frame 22 with respect to the base frame 21 is changed.

In the above-described embodiment, the control unit 32 stops running the lawn mowing apparatus 53 if any of the load sensors 30 detects a load that is greater than or equal to a preset value, and causes the wheels 2 to roll in a direction opposite to the direction in which the wheels 2 were rolling when the load that is greater than or equal to the preset value was detected. However, if any of the load sensors 30 detects a load that is greater than or equal to the preset value, the control unit 32 can alternatively be configured to at least either stop running the lawn mowing apparatus 53 or roll the wheels 2 in a direction opposite to the direction in which the wheels 2 were rolling when the load that is greater than or equal to the preset value was detected, or may alternatively be configured to not stop running the lawn mowing apparatus 53 and not roll the wheels 2 in the opposite direction.

In the above-described embodiment, the operation is a lawn mowing operation, but the operation may alternatively be any other operation.

Second Embodiment

The second embodiment of the present invention will be described below.

A work vehicle according to the present invention is configured to be able to perform an operation smoothly. The work vehicle performs the operation while traveling autonomously, and the following description will take a lawn mowing operation as an example of the operation performed by the work vehicle. Here, "autonomous traveling" according to this embodiment refers to traveling while avoiding objects (e.g. obstacles) along a traveling path that is set based on the output of a device mounted in the work vehicle (e.g. output of a sensor, an image captured by a camera etc.). Such a work vehicle corresponds to a so-called autonomous robot.

Figure 6:
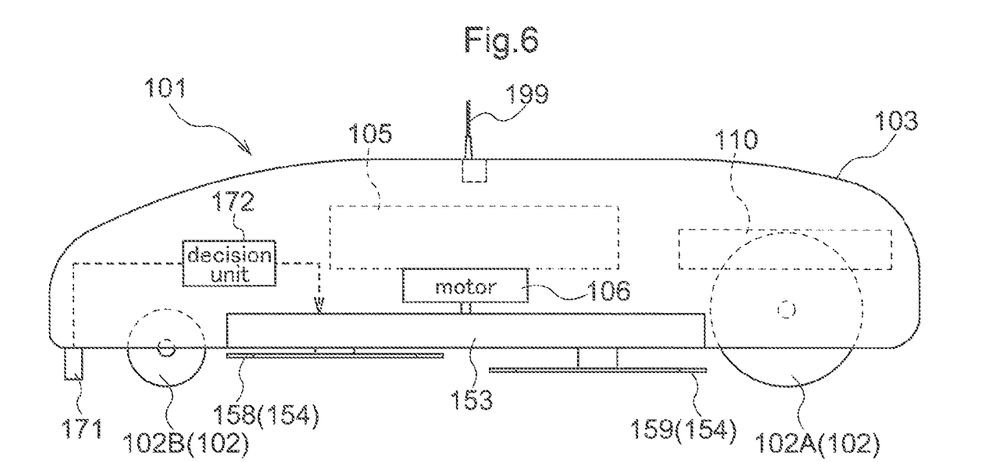
FIG. 6 illustrates a second embodiment (the same applies to FIGS. 7 and 8), and is a side view of a work vehicle.
Figure 7:
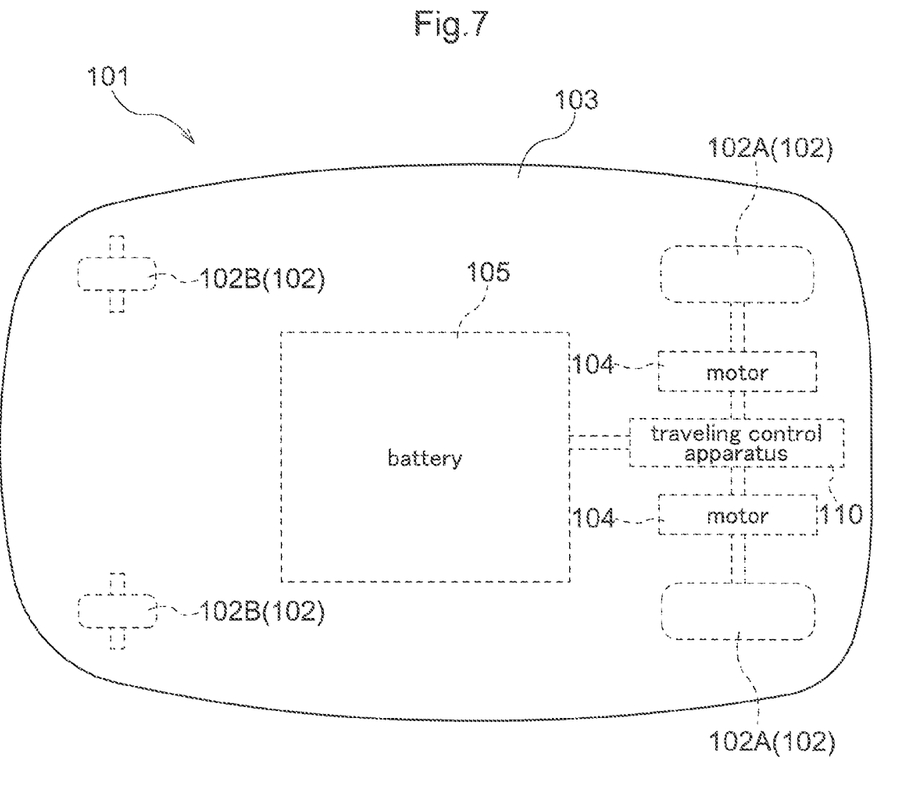
FIG. 7 is a plan view of the work vehicle.

FIG. 6 is a side view of a work vehicle 101 according to this embodiment, and FIG. 7 is a plan view of the work vehicle 101. As shown in FIGS. 6 and 7, the work vehicle 101 includes wheels 102 and a body 103 (an example of a vehicle body). The wheels 102 include first wheels 102A on one end side of the vehicle body in the vehicle-lengthwise direction, and second wheels 102B on the other end side in the vehicle-lengthwise direction. A pair of left and right first wheels 102A and a pair of left and right second wheels 102B are provided, respectively in the vehicle-widthwise direction. In this embodiment, the first wheels 102A are provided on the rear side of the work vehicle 101 relative to the traveling direction. The first wheels 102A are configured as wheels that are driven and steered. The first wheels 102A are driven by a later-described traveling control apparatus 110. The second wheels 102B are provided on the front side of the work vehicle 101 relative to the traveling direction. The second wheels 102B are configured as so-called caster wheels. With this configuration, if the left and right first wheels 102A are rolling in the same direction at the same speed, the work vehicle 101 travels straight. If the left and right first wheels 102A are rolling in the same direction at different speeds, the work vehicle 101 is in a state of being steered toward the side of one of the left and right first wheels 102A that is rolling at a lower speed. Furthermore, if the left and right first wheels 102A are rolling in different directions at the same speed, the work vehicle 101 can rotate on the spot. Although, in the above description, a pair of left and right first wheels 102A and a pair of left and right second wheels 102B are provided, respectively in the vehicle-widthwise direction, this is merely an example. For example, the number of first wheels 102A may differ from the number of second wheels 102B, or the number of first wheels 102A and the number of second wheels 102B may be one or three or more, in accordance with the size of the vehicle body.

The body 103 is provided with a pair of motors 104, which serve as motive power sources for the first wheels 102A, a battery 105 for storing electric power and supplying electric power to the motors 104 and electrical devices that the work vehicle 101 has, a traveling control apparatus 110 for controlling traveling of the work vehicle 101, and a motor 106 for driving a lawn mowing apparatus 153 (an example of an operation unit), which has a mowing blade 154, which is used in lawn mowing. The motor 106 is driven by electric power supplied by the battery 105.

The body 103 is also provided with a satellite positioning module 199, which is configured as a GNSS module. The satellite positioning module 199 has a satellite antenna for receiving a GPS signal or a GNSS signal ("GPS signal" in this embodiment). Note that the satellite positioning module 199 may include an inertial navigation module that incorporates a gyro-acceleration sensor and/or a magnetic direction sensor to complement satellite navigation. Needless to say, the inertial navigation module may be provided at location separate from the satellite positioning module 199. A GPS signal acquired by the satellite positioning module 199 is used in aforementioned autonomous traveling of the work vehicle 101.

The lawn mowing apparatus 153 includes a load reduction unit 158 and an operation completion unit 159. The load reduction unit 158 performs an operation for reducing the load of the operation whose load is greater than a preset load. For example, in the lawn mowing operation, it is not easy to cut lawn grass to an intended grass height at a time, and such way of cutting tends to shorten the lifetime of the mowing blade 154 of the lawn mowing apparatus 153. For this reason, it is favorable to first cut lawn grass to a grass height that is greater than the intended grass height, and then further cut the lawn grass to the intended grass height. In this embodiment, the load is determined based on the grass height in order to make it easier to readily understand the operation load. Accordingly, "an operation for reducing the load of the operation whose load is greater than a preset load" means an operation to cut lawn grass to a predetermined grass height if the grass height of the lawn grass is greater than a preset grass height. Accordingly, the load reduction unit 158 performs an operation to cut lawn grass to the predetermined grass height if the grass height lawn grass is greater than the preset grass height.

Specifically, in this embodiment, a front mowing blade that is provided in a front portion of the vehicle body relative to the traveling direction corresponds to the load reduction unit 158. This front mowing blade is provided at a position higher than the position of a rear mowing blade, which is the later-described operation completion unit 159. Thus, the grass height of overgrown lawn grass can be first cut to the predetermined grass height. As a result, the subsequent lawn mowing operation can be lessened.

The operation completion unit 159 performs the remainder of the operation, for which the load reduction unit 158 has reduced the load. As mentioned above, in this embodiment, the load reduction unit 158 has performed the operation to cut lawn grass to the predetermined grass height before the operation completion unit 159 performs the lawn mowing operation. Thus, "the remainder of the operation, for which the load reduction unit 158 has reduced the load" means an operation to cut, to an intended grass height, the lawn grass that has been cut to the predetermined grass height by the front mowing blade, in the lawn mowing operation. Accordingly, the operation completion unit 159 performs the operation to cut the lawn grass that has been cut to the predetermined grass height by the front mowing blade to the intended grass height, in the lawn mowing operation. The work vehicle 101 can thus complete the lawn mowing operation.

Specifically, in this embodiment, the rear mowing blade that is provided in the rear portion of the vehicle body relative to the traveling direction corresponds to the operation completion unit 159. This rear mowing blade is provided at a position lower than the position of the front mowing blade, which is the load reduction unit 158. Thus, the grass height of lawn grass that has been cut to the predetermined height by the front mowing blade can be cut to the intended grass height.

The work vehicle 101 can thus perform the lawn mowing operation smoothly by cutting lawn grass at separate times. In addition, lawn grass can be cut neatly.

In this embodiment, the work vehicle 101 is provided with a load calculation unit 171 forward of the lawn mowing apparatus 153 relative to the traveling direction in the vehicle body. The load calculation unit 171 calculates the operation load. In this embodiment, the grass height of lawn grass that is to be cut corresponds to the operation load. Thus the load calculation unit 171 calculates the grass height of the lawn grass that is to be cut by the work vehicle 101. This calculation of the grass height can be performed using a load sensor, for example. Alternatively, the grass height can be calculated using an infrared sensor or an image captured by a camera. Here, there is a possibility that the grass height of lawn grass cannot be calculated appropriately as a result of the lawn grass being trodden by the wheels 102 of the work vehicle 101. To appropriately calculate the grass height, in this embodiment, the load calculation unit 171 is provided forward, relative to the traveling direction, of the second wheels 102B that are provided on the front side of the work vehicle 101 relative to the traveling direction. Accordingly, the load calculation unit 171 is provided forward, relative to the traveling direction, of the second wheels 102B that are provided on the front side of the work vehicle 101 relative to the traveling direction, and calculates the grass height of lawn grass that is to be cut. The result of calculation performed by the load calculation unit 171 is transferred to a later-described decision unit 172.

The decision unit 172 decides whether to drive both the load reduction unit 158 and the operation completion unit 159 or to only drive the operation completion unit 159, based on the calculation result from the load calculation unit 171. The calculation result is transferred to the decision unit 172 from the load calculation unit 171. For example, if the grass height of lawn grass that is to be cut exceeds a predetermined value (e.g. the height of the front mowing blade), the lawn grass is first cut such that the grass height thereof is the predetermined value by the front mowing blade, which is the load reduction unit 158. Thereafter, the rear mowing blade, which is the operation completion unit 159, cuts the lawn grass to the intended grass height. Thus the lawn mowing operation can be performed more smoothly than in the case of cutting lawn grass only using the operation completion unit 159. With this configuration, if the calculation result transferred from the load calculation unit 171, i.e. the grass height of the lawn grass that is to be cut exceeds the predetermined value (e.g. the height of the front mowing blade), the decision unit 172 decides to drive both the front mowing blade, which is the load reduction unit 158, and the rear mowing blade, which is the operation completion unit 159.

On the other hand, for example, if the grass height of the lawn grass that is to be cut is smaller than or equal to the predetermined value (e.g. the height of the front mowing blade), the lawn grass cannot be cut even if the front mowing blade, which is the load reduction unit 158, is driven. Therefore, the lawn mowing operation is performed to cut the lawn grass to the intended grass height only using the rear mowing blade, which is the operation completion unit 159. With this configuration, if the calculation result transferred from the load calculation unit 171, i.e. the grass height of the lawn grass that is to be cut is smaller than or equal to the predetermined value (e.g. the height of the front mowing blade), the decision unit 172 decides to only drive the rear mowing blade, which is the operation completion unit 159. The result of the decision made by the decision unit 172 is transferred to the lawn mowing apparatus 153, and the lawn mowing apparatus 153 drives the mowing blade(s) to be driven based on the decision result from the decision unit 172. Note that the grass heights of the lawn grass that is to be cut respectively by the front mowing blade, which is the load reduction unit 158, and the rear mowing blade, which is the operation completion unit 159, can be set by the user inputting desired mowing heights using a terminal.

Also, considering such an operation, completion of the operation requires some cost. It is preferable that the decision unit 172 calculates the cost required to complete the operation based on at least one of the time required for the operation that was performed previously in the same field, the number of times that the battery 105 was charged, and the power consumption required for the operation, and decides the running state of the lawn mowing apparatus 153 also using the calculated cost. The operation that was performed previously in the same field refers to the lawn mowing operation that was performed previously in the working field in which the work vehicle 101 is to perform at this time. The number of times that the battery 105 was charged refers to the number of times that the battery 105 was charged while the lawn mowing operation was performed previously in this working field. Electric power stored in this battery 105 is also used by the work vehicle 101 to travel. The number of times that the battery 105 is charged is therefore proportional to the traveling distance of the work vehicle 101. It is favorable that the power consumption required for the operation is calculated based on electric power output by the battery 105. Thus, not only the power consumption by the lawn mowing apparatus 153 but also the power consumption required for the work vehicle 101 to travel can be taken into consideration.

Accordingly, the decision unit 172 calculates a cost needed for the current lawn mowing operation using at least one of the time required for the lawn mowing operation that was performed previously in the working field in which the work vehicle 101 is to perform the lawn mowing operation at this time, the number of times that the battery 105 was charged while the lawn mowing operation was performed previously in this working field, and electric power that was output by the battery 105, and decides whether to drive both the front mowing blade, which is the load reduction unit 158, and the rear mowing blade, which is the operation completion unit 159, or drive only the rear mowing blade, which is the operation completion unit 159, while also giving consideration to the calculated cost. Thus the lawn mowing operation can be performed efficiently.

Variations of Second Embodiment

Figure 8:
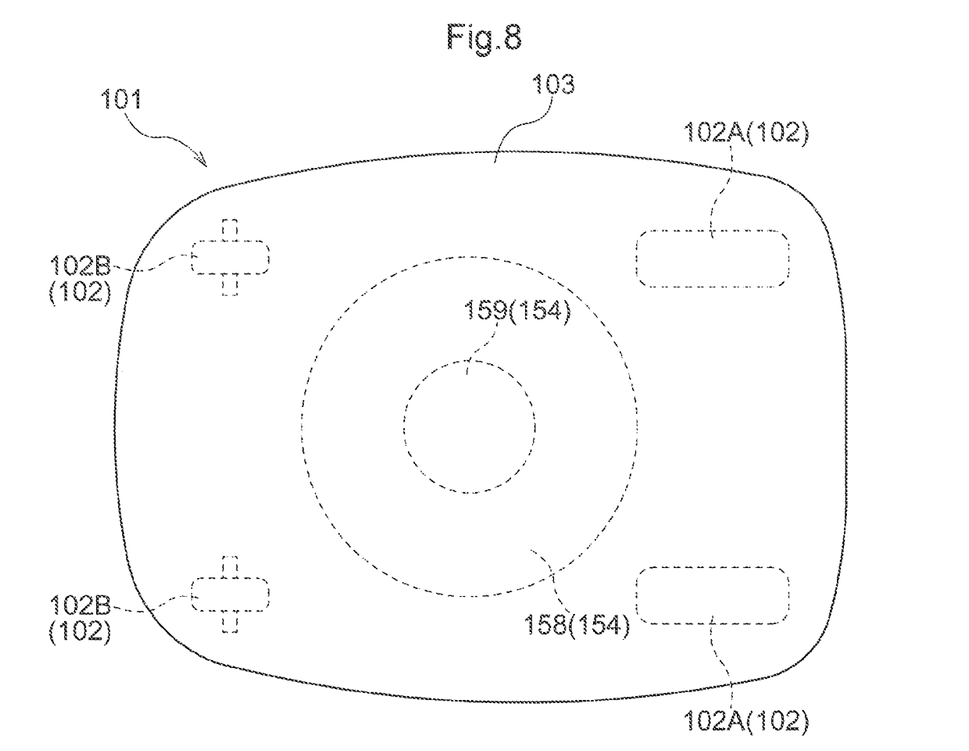
FIG. 8 is a plan view of a work vehicle according to a variation.

In the above-described embodiment, the load reduction unit 158 is provided in the front portion of the vehicle body relative to the traveling direction, and the operation completion unit 159 is provided in the rear portion of the vehicle body relative to the traveling direction. However, as shown in FIG. 8, the operation completion unit 159 may alternatively be provided in the center portion of the vehicle body as viewed from above, and the load reduction unit 158 may alternatively be provided so as to surround the operation completion unit 159 as viewed from above the vehicle body. In this case, it is favorable that the operation completion unit 159 provided in the center portion is a reel or a rotary blade for fine cutting, which needs to be accurate, and the load reduction unit 158 provided around the operation completion unit 159 is a flail mower or a clipper mower. With this configuration as well, the load reduction unit 158 can reduce the load on the operation completion unit 159, and the operation can be performed smoothly, similarly to the above-described embodiment.

In the above-described embodiment, the work vehicle 101 has the load calculation unit 171 for calculating an operation load forward of the lawn mowing apparatus 153 relative to the traveling direction in the vehicle body, and has the decision unit 172 for deciding whether to drive both the load reduction unit 158 and the operation completion unit 159 or to only drive the operation completion unit 159, based on the calculation result from the load calculation unit 171. However, the work vehicle 101 may alternatively be configured to not include the load calculation unit 171 and the decision unit 172. In this case, it is favorable to perform the operation while constantly driving both the load reduction unit 158 and the operation completion unit 159. Also, the load calculation unit 171 may alternatively be provided forward of the lawn mowing apparatus 153 relative to the traveling direction and rearward of the second wheels 102B. In this case, it is favorable that the load calculation unit 171 is provided at a position (e.g. in the center portion of the work vehicle 101 relative to the vehicle width direction) at which lawn grass is not trodden by the second wheels 102B.

In the above-described embodiment, the decision unit 172 decides the running state of the lawn mowing apparatus 153 also using the cost required to complete the operation. However, the decision unit 172 can alternatively be configured to decide the running state of the lawn mowing apparatus 153 without using the cost required to complete the operation.

In the above embodiment, the operation is a lawn mowing operation, but the operation may alternatively be any other operation.

The present invention can be applied to a work vehicle that performs an operation while traveling autonomously.

The invention claimed is:

1. A work vehicle that performs an operation while traveling autonomously, comprising:
   a base frame configured to support a wheel;
   a unit frame configured to support an operation unit that performs the operation;
   a link frame capable of changing a relative height of the unit frame with respect to the base frame, the link frame spanning between the base frame and the unit frame;
   a setting unit configured to set an operating height of the operation unit with respect to a working surface of a working field in which the operation is performed, in accordance with operation information indicating an operation target to be subjected to the operation;

a working field map acquisition unit configured to acquire a map illustrating the working field;

a path information acquisition unit configured to acquire traveling path information indicating a traveling path during the operation; and a determination unit configured to determine whether or not a current location is in an area where the lawn grass has been cut based on the map and the traveling path information, wherein:

the operation is a lawn mowing operation to cut lawn grass growing on the working field, the work vehicle further comprises an evaluation unit configured to evaluate a grass height of the lawn grass and a grass density of the lawn grass, the setting unit sets the operating height in accordance with a result of the evaluation performed by the evaluation unit, and the evaluation unit evaluates the grass height and the grass density based on a result of the determination performed by the determination unit.

2. The work vehicle according to claim 1, further comprising:

a captured image acquisition unit configured to acquire a captured image obtained by capturing an image of the working field, wherein the evaluation unit evaluates the grass height and the grass density based on the captured image.

3. A work vehicle that performs an operation while traveling autonomously, comprising:

a base frame configured to support a wheel;

a unit frame configured to support an operation unit that performs the operation;

a link frame capable of changing a relative height of the unit frame with respect to the base frame, the link frame spanning between the base frame and the unit frame;

a setting unit configured to set an operating height of the operation unit with respect to a working surface of a working field in which the operation is performed, in accordance with operation information indicating an operation target to be subjected to the operation;

a load sensor configured to detect a load; and a control unit configured to, if the load sensor detects a load that is greater than or equal to a preset value, stop running the operation unit and roll the wheel in a direction opposite to a direction in which the wheel was rolling when the load sensor detected the load that is greater than or equal to the preset value.

4. The work vehicle according to claim 3, further comprising:

a bumper member to which the load sensor is attached, the bumper member being supported by the base frame so as to at least surround the operation unit and the wheel, wherein the bumper member is configured to be in a state of surrounding the operation unit and the wheel even if a height of the unit frame with respect to the base frame is charged.

5. A work vehicle that performs an operation while traveling autonomously, comprising:

an operation unit configured to perform the operation, the operation unit being mounted in a vehicle body:

a load calculation unit configured to calculate a load of the operation, the load calculation unit being provided forward of the operation unit relative to the traveling direction in the vehicle body; and a decision unit configured to decide whether to drive both the load reduction unit and the operation completion unit or to only drive the operation completion unit, based on a result of the calculation performed by the load calculation unit, wherein the operation unit includes a load reduction unit configured to perform an operation for reducing a load of the operation whose load is greater than a preset load, and an operation completion unit configured to perform an operation, which is the remainder of the operation, for which the load reduction unit has reduced the load.

6. The work vehicle according to claim 5, wherein:

the load reduction unit is provided in a front portion of the vehicle body relative to a traveling direction, and the operation completion unit is provided in a rear portion of the vehicle body relative to the traveling direction.

7. The work vehicle according to claim 5, wherein:

the operation completion unit is provided in a center portion of the vehicle body as viewed from above, and the load reduction unit is provided so as to surround the operation completion unit in the vehicle body as viewed from above.

8. The work vehicle according to claim 5, further comprising:

a load calculation unit configured to calculate a load of the operation, the load calculation unit being provided forward of the operation unit relative to the traveling direction in the vehicle body; and a decision unit configured to decide whether to drive both the load reduction unit and the operation completion unit or to only drive the operation completion unit, based on a result of the calculation performed by the load calculation unit.

9. The work vehicle according to claim 5, wherein:

the operation unit is driven by a motor that is supplied with electric power from a battery mounted in the vehicle body, and the decision unit decides a running state of the operation unit also using a cost required to complete the operation, the cost being calculated based on at least one of time required for an operation that was previously performed in the same working field, the number of times that the battery was charged, and power consumption required for the operation.

* * * * *

UNITED STATES PATENT AND TRADEMARK OFFICE
CERTIFICATE OF CORRECTION

PATENT NO. : 11,452,255 B2
APPLICATION NO. : 16/432039
DATED : September 27, 2022
INVENTOR(S) : Hideya Umemoto et al.

It is certified that error appears in the above-identified patent and that said Letters Patent is hereby corrected as shown below:

On the Title Page

Delete the title page and substitute therefore with the attached page.

In the Claims

Column 14, Line 58, through Column 16, Line 56, delete Claims 1 - 9 as follows:
"1. A work vehicle that performs an operation while traveling autonomously, comprising:
a base frame configured to support a wheel;
a unit frame configured to support an operation unit that performs the operation;
a link frame capable of changing a relative height of the unit frame with respect to the base frame, the link frame spanning between the base frame and the unit frame;
a setting unit configured to set an operating height of the operation unit with respect to a working surface of a working field in which the operation is performed, in accordance with operation information indicating an operation target to be subjected to the operation;
a working field map acquisition unit configured to acquire a map illustrating the working field;
a path information acquisition unit configured to acquire traveling path information indicating a traveling path during the operation; and
a determination unit configured to determine whether or not a current location is in an area where the lawn grass has been cut based on the map and the traveling path information, wherein:
the operation is a lawn mowing operation to cut lawn grass growing on the working field,
the work vehicle further comprises an evaluation unit configured to evaluate a grass height of the lawn grass and a grass density of the lawn grass,
the setting unit sets the operating height in accordance with a result of the evaluation performed by the evaluation unit, and
the evaluation unit evaluates the grass height and the grass density based on a result of the determination performed by the determination unit.
2. The work vehicle according to claim 1, further comprising:
a captured image acquisition unit configured to acquire a captured image obtained by capturing an image of the working field, Signed and Sealed this
Eleventh Day of April, 2023

*Katherine Kelly Vidal*
Katherine Kelly Vidal
*Director of the United States Patent and Trademark Office* wherein the evaluation unit evaluates the grass height and the grass density based on the captured image.

3. A work vehicle that performs an operation while traveling autonomously, comprising:

a base frame configured to support a wheel;

a unit frame configured to support an operation unit that performs the operation;

a link frame capable of changing a relative height of the unit frame with respect to the base frame, the link frame spanning between the base frame and the unit frame;

a setting unit configured to set an operating height of the operation unit with respect to a working surface of a working field in which the operation is performed, in accordance with operation information indicating an operation target to be subjected to the operation;

a load sensor configured to detect a load; and a control unit configured to, if the load sensor detects a load that is greater than or equal to a preset value, stop running the operation unit and roll the wheel in a direction opposite to a direction in which the wheel was rolling when the load sensor detected the load that is greater than or equal to the preset value.

4. The work vehicle according to claim 3, further comprising:

a bumper member to which the load sensor is attached, the bumper member being supported by the base frame so as to at least surround the operation unit and the wheel, wherein the bumper member is configured to be in a state of surrounding the operation unit and the wheel even if a height of the unit frame with respect to the base frame is charged.

5. A work vehicle that performs an operation while traveling autonomously, comprising:

an operation unit configured to perform the operation, the operation unit being mounted in a vehicle body:

a load calculation unit configured to calculate a load of the operation, the load calculation unit being provided forward of the operation unit relative to the traveling direction in the vehicle body; and a decision unit configured to decide whether to drive both the load reduction unit and the operation completion unit or to only drive the operation completion unit, based on a result of the calculation performed by the load calculation unit, wherein the operation unit includes a load reduction unit configured to perform an operation for reducing a load of the operation whose load is greater than a preset load, and an operation completion unit configured to perform an operation, which is the remainder of the operation, for which the load reduction unit has reduced the load.

6. The work vehicle according to claim 5, wherein:

the load reduction unit is provided in a front portion of the vehicle body relative to a traveling direction, and the operation completion unit is provided in a rear portion of the vehicle body relative to the traveling direction.

7. The work vehicle according to claim 5, wherein:

the operation completion unit is provided in a center portion of the vehicle body as viewed from above, and the load reduction unit is provided so as to surround the operation completion unit in the vehicle body as viewed from above.

8. The work vehicle according to claim 7, further comprising:

a load calculation unit configured to calculate a load of the operation, the load calculation unit being provided forward of the operation unit relative to the traveling direction in the vehicle body; and

CERTIFICATE OF CORRECTION (continued)

U.S. Pat. No. 11,452,255 B2 a decision unit configured to decide whether to drive both the load reduction unit and the operation completion unit or to only drive the operation completion unit, based on a result of the calculation performed by the load calculation unit.

9. The work vehicle according to claim 5, wherein:

the operation unit is driven by a motor that is supplied with electric power from a battery mounted in the vehicle body, and the decision unit decides a running state of the operation unit also using a cost required to complete the operation, the cost being calculated based on at least one of time required for an operation that was previously performed in the same working field, the number of times that the battery was charged, and power consumption required for the operation."

And insert the following:

-- 1. A work vehicle that performs an operation while traveling autonomously, comprising:

a base frame configured to support a wheel;

a unit frame configured to support an operation unit that performs the operation;

a link frame capable of changing a relative height of the unit frame with respect to the base frame, the link frame spanning between the base frame and the unit frame;

a setting unit configured to set an operating height of the operation unit with respect to a working surface of a working field in which the operation is performed, in accordance with operation information indicating an operation target to be subjected to the operation;

a working field map acquisition unit configured to acquire a map illustrating the working field;

a path information acquisition unit configured to acquire traveling path information indicating a traveling path during the operation; and a determination unit configured to determine whether or not a current location is in an area where the lawn grass has been cut based on the map and the traveling path information, wherein:

the operation is a lawn mowing operation to cut lawn grass growing on the working field, the work vehicle further comprises an evaluation unit configured to evaluate a grass height of the lawn grass and a grass density of the lawn grass, the setting unit sets the operating height in accordance with a result of the evaluation performed by the evaluation unit, and the evaluation unit evaluates the grass height and the grass density based on a result of the determination performed by the determination unit.

2. The work vehicle according to claim 1, further comprising:

a captured image acquisition unit configured to acquire a captured image obtained by capturing an image of the working field, wherein the evaluation unit evaluates the grass height and the grass density based on the captured image.

3. A work vehicle that performs an operation while traveling autonomously, comprising:

a base frame configured to support a wheel;

a unit frame configured to support an operation unit that performs the operation;

a link frame capable of changing a relative height of the unit frame with respect to the base frame, the link frame spanning between the base frame and the unit frame;

a setting unit configured to set an operating height of the operation unit with respect to a working surface of a working field in which the operation is performed, in accordance with operation information indicating an operation target to be subjected to the operation;

a load sensor configured to detect a load; and a control unit configured to, if the load sensor detects a load that is greater than or equal to a preset value, stop running the operation unit and roll the wheel in a direction opposite to a direction in which the wheel was rolling when the load sensor detected the load that is greater than or equal to the preset value.

4. The work vehicle according to claim 3, further comprising:

a bumper member to which the load sensor is attached, the bumper member being supported by the base frame so as to at least surround the operation unit and the wheel, wherein the bumper member is configured to be in a state of surrounding the operation unit and the wheel even if a height of the unit frame with respect to the base frame is charged.

5. A work vehicle that performs an operation while traveling autonomously, comprising:

an operation unit configured to perform the operation, the operation unit being mounted in a vehicle body:

a load calculation unit configured to calculate a load of the operation, the load calculation unit being provided forward of the operation unit relative to the traveling direction in the vehicle body; and a decision unit configured to decide whether to drive both the load reduction unit and the operation completion unit or to only drive the operation completion unit, based on a result of the calculation performed by the load calculation unit, wherein the operation unit includes a load reduction unit configured to perform an operation for reducing a load of the operation whose load is greater than a preset load, and an operation completion unit configured to perform an operation, which is the remainder of the operation, for which the load reduction unit has reduced the load.

6. The work vehicle according to claim 5, wherein:

the load reduction unit is provided in a front portion of the vehicle body relative to a traveling direction, and the operation completion unit is provided in a rear portion of the vehicle body relative to the traveling direction.

7. The work vehicle according to claim 5, wherein:

the operation completion unit is provided in a center portion of the vehicle body as viewed from above, and the load reduction unit is provided so as to surround the operation completion unit in the vehicle body as viewed from above.

8. The work vehicle according to claim 5, wherein:

the operation unit is driven by a motor that is supplied with electric power from a battery mounted in the vehicle body, and the decision unit decides a running state of the operation unit also using a cost required to complete the operation, the cost being calculated based on at least one of time required for an operation that was previously performed in the same working field, the number of times that the battery was charged, and power consumption required for the operation. --.

(12) United States Patent
Umemoto et al.

(10) Patent No.: US 11,452,255 B2
(45) Date of Patent: Sep. 27, 2022

(54) WORK VEHICLE

(71) Applicant: Kubota Corporation, Osaka (JP)

(72) Inventors: Hideya Umemoto, Sakai (JP); Hitoshi Aoyama, Sakai (JP); Katsuhiko Uemura, Sakai (JP); Takeshi Komorida, Sakai (JP); Kensuke Uemoto, Sakai (JP); Kentaro Shinkai, Sakai (JP); Shinichi Yamada, Sakai (JP); Kanako Komori, Sakai (JP)

(73) Assignee: Kubota Corporation, Osaka (JP)

(*) Notice: Subject to any disclaimer, the term of this patent is extended or adjusted under 35 U.S.C. 154(b) by 693 days.

(21) Appl. No.: 16/432,039

(22) Filed: Jun. 5, 2019

(65) Prior Publication Data

US 2019/0387671 A1 Dec. 26, 2019

(30) Foreign Application Priority Data

Jun. 21, 2018 (JP) ................... JP2018-118112

(51) Int. Cl.
| | | |
|---|---|---|
| *A01D 34/00* | (2006.01) | |
| *A01D 34/64* | (2006.01) | |
| *A01D 34/74* | (2006.01) | |
| *G05D 1/00* | (2006.01) | |
| *G05D 1/02* | (2020.01) | |
| *A01D 101/00* | (2006.01) | |

(52) U.S. Cl.
CPC .......... *A01D 34/008* (2013.01); *A01D 34/64* (2013.01); *A01D 34/74* (2013.01); *G05D 1/0088* (2013.01); *G05D 1/0212* (2013.01); *A01D 2101/00* (2013.01); *G05D 2201/0208* (2013.01)

(58) Field of Classification Search
CPC ...... A01D 34/008; A01D 34/64; A01D 34/74; A01D 2101/00; G05D 1/0088; G05D 1/0212; G05D 2201/0208
USPC ........................................................ 701/28
See application file for complete search history.

(56) References Cited

U.S. PATENT DOCUMENTS

| | | | |
|---|---|---|---|
| 2005/0108998 A1 | 5/2005 | Hunt et al. | |
| 2007/0046044 A1* | 3/2007 | Tanabe ................ | B60R 21/34 293/120 |
| 2008/0136613 A1* | 6/2008 | Takafuji ............ | B60R 21/0132 340/436 |
| 2008/0203742 A1* | 8/2008 | Takahashi ........... | B60R 19/483 293/117 |

(Continued)

FOREIGN PATENT DOCUMENTS

| | | |
|---|---|---|
| EP | 1532856 A2 | 5/2005 |
| EP | 3225094 A1 | 10/2017 |

(Continued)

*Primary Examiner* — Muhammad Shafi
(74) *Attorney, Agent, or Firm* — The Webb Law Firm (57) ABSTRACT

A work vehicle that performs an operation while traveling autonomously includes: a base frame configured to support a wheel; a unit frame configured to support an operation unit that performs the operation; a link frame capable of changing a relative height of the unit frame with respect to the base frame, the link frame spanning between the base frame and the unit frame; and a setting unit configured to set an operating height of the operation unit with respect to a working surface of a working field in which the operation is performed, in accordance with operation information indicating an operation target to be subjected to the operation.

8 Claims, 5 Drawing Sheets